G. BRABROOK.
Coffin-Plates.
No. 149,982.
Patented April 21, 1874.
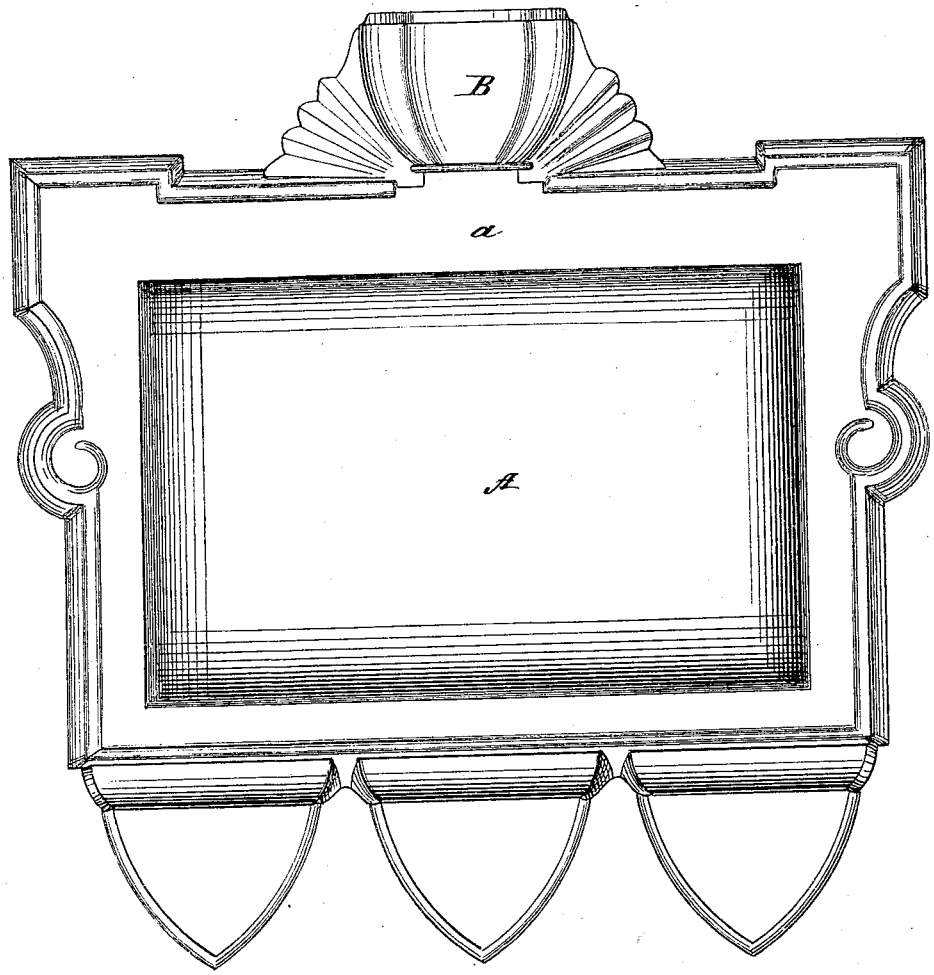
WITNESSES:
G. Mathys.
Solon C. Kemon
INVENTOR:
Geo. Brabrook
BY
ATTORNEYS.

UNITED STATES PATENT OFFICE.

GEORGE BRABROOK, OF TAUNTON, MASSACHUSETTS, ASSIGNOR TO REED & BARTON, OF SAME PLACE.

IMPROVEMENT IN COFFIN-PLATES.

Specification forming part of Letters Patent No. 149,982, dated April 21, 1874; application filed March 31, 1874.

*To all whom it may concern:*

Be it known that I, GEORGE BRABROOK, of Taunton, in the county of Bristol and State of Massachusetts, have invented a new and useful Improvement in Coffin-Plates: and I do hereby declare that the following is a full, clear, and exact description of the same, reference being had to the accompanying drawing, forming a part of this specification, in which—

Figure 1 is a plan view. Fig. 2 is a transverse section.

The invention relates to a novel and useful construction of coffin-plates, whereby they may be not only adapted to receive the usual superscription, but also to hold the bouquet, which is often placed upon the top of coffins.

The invention will first be described, in connection with all that is necessary to a full understanding thereof, and then pointed out in the claim.

A represents a coffin-plate, which is made usually of silver, and may be characterized by any shape, configuration, or ornamentation of parts, or of the whole. B is a raised and subjacently-concaved attachment, preferably located about the middle of the upper side $a$ and permanently attached to the coffin-plates, or made of one or more pieces adjustable to each other and to the coffin-plate.

When the stem end of the flowers or bouquet has been properly adjusted and secured in the concavity of attachment B, the flowers are preserved from disarrangement and in their proper position on the coffin.

Having thus described my invention, what I claim is—

A coffin-plate provided with a bouquet-holder, as and for the purpose specified.

GEORGE BRABROOK.

Witnesses:
    F. L. FISH,
    THEO. P. HALL.